United States Patent Office 3,324,965
Patented June 13, 1967

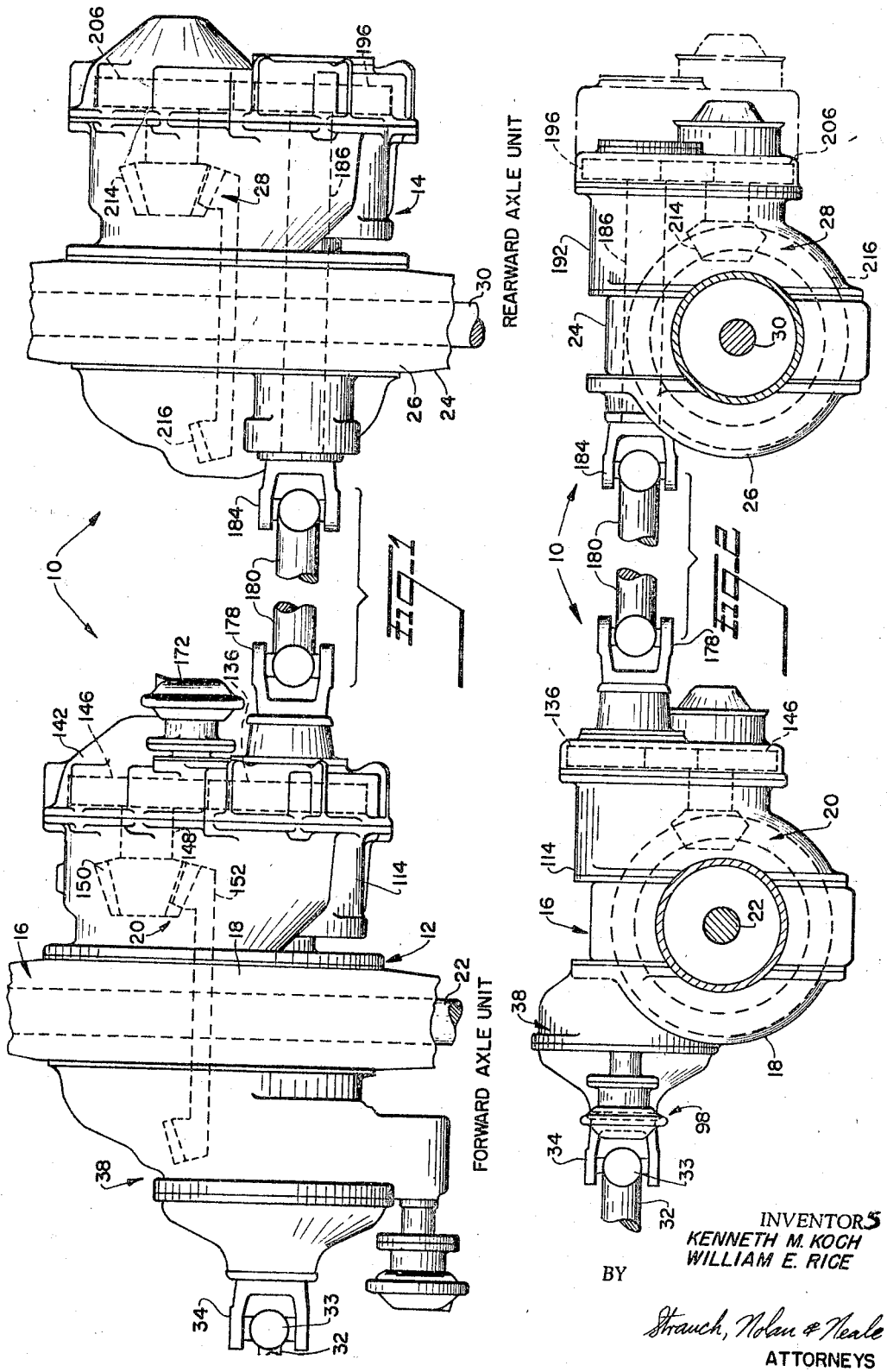

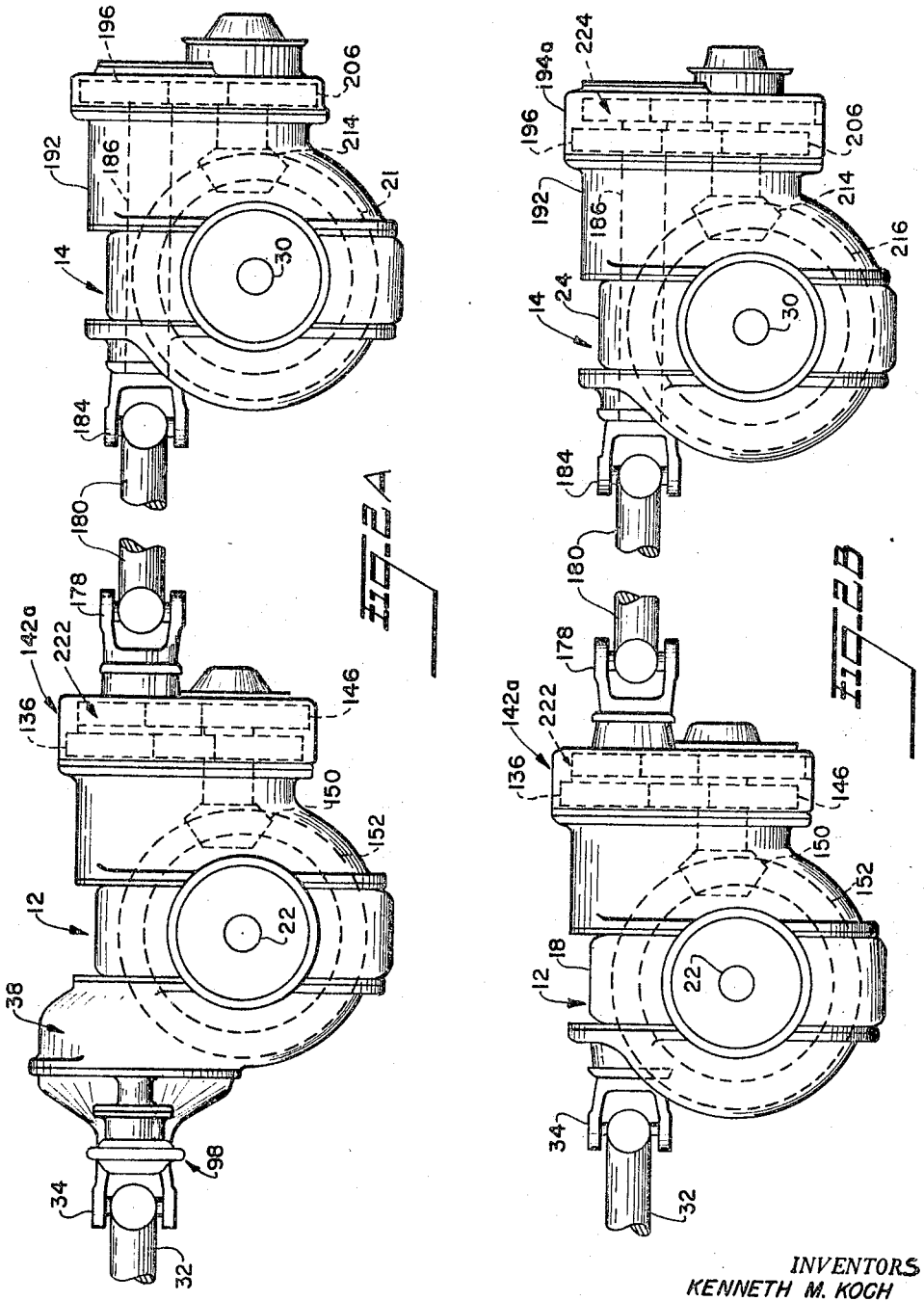

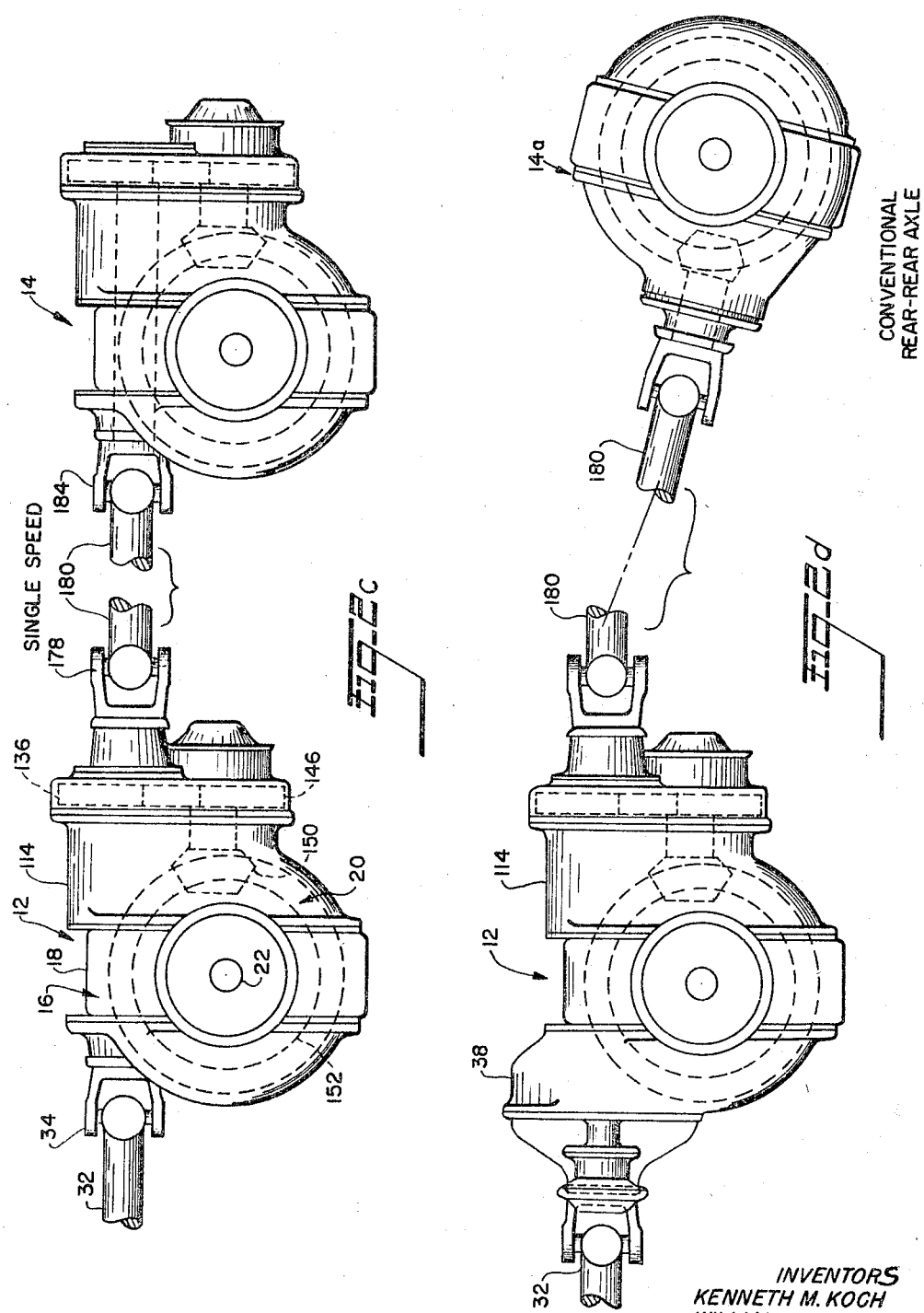

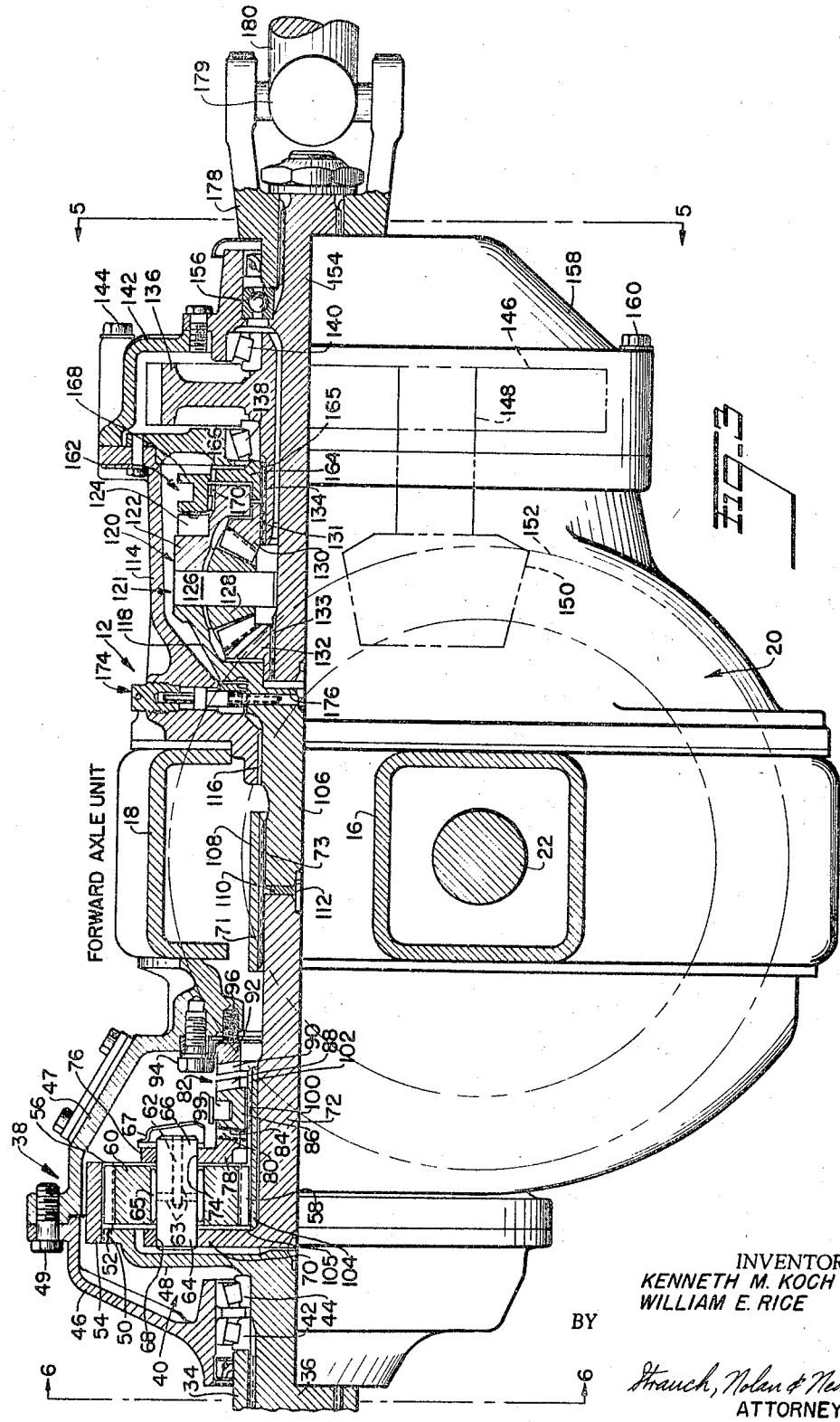

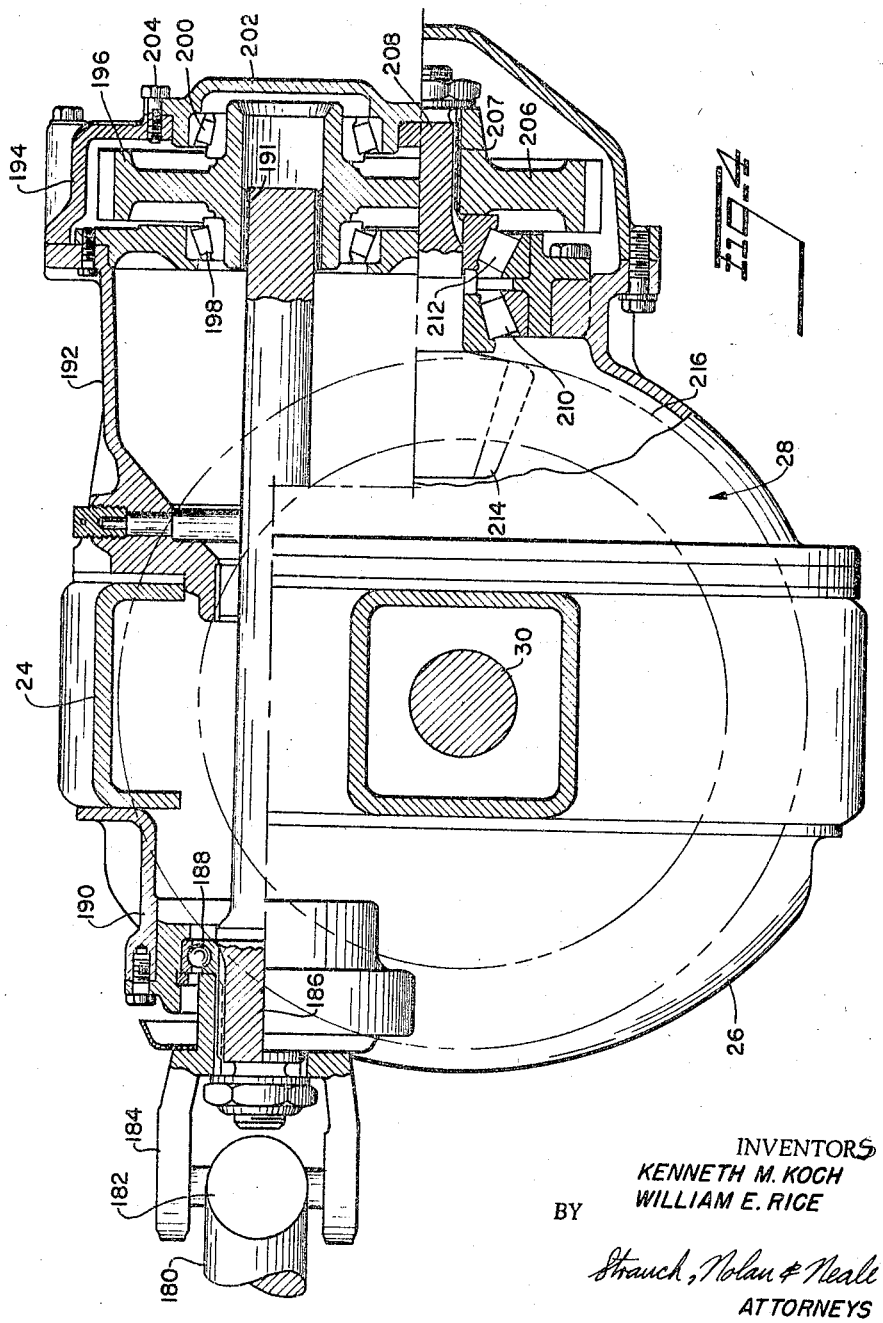

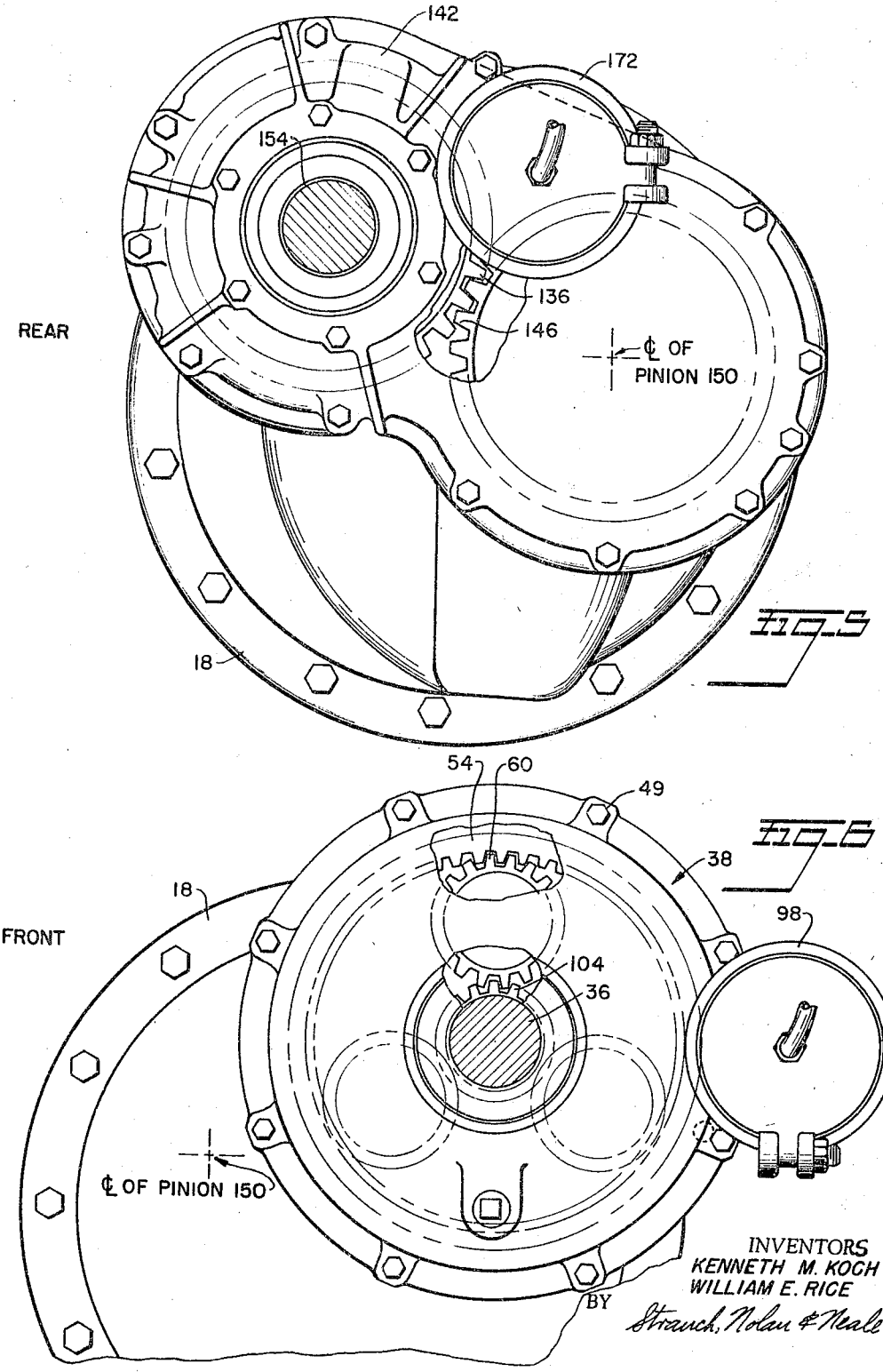

3,324,965
TANDEM AXLE DRIVE MECHANISM
Kenneth M. Koch, Dearborn, and William E. Rice, Ferndale, Mich., assignors to Rockwell-Standard Corporation, Pittsburgh, Pa., a corporation of Delaware
Filed Oct. 5, 1964, Ser. No. 401,301
15 Claims. (Cl. 180—22)

This invention refers to axle drives for roadway vehicles and more in particular to a tandem axle drive mechanism equipped with special speed change gearing and inter-axle differential arrangements.

Tandem axle drives equipped with inter-axle differential mechanisms are known, as disclosed in United States patents to B. W. Keese No. 2,870,853 and 2,870,854. Likewise, tandem axle drive mechanisms with speed change gearing are known, as disclosed in United States Patent No. 2,064,262 to B. W. Keese.

In prior tandem axle drive mechanisms of this type, difficulties have been encountered in short-coupled vehicles, such as cab-over-engine tractors or the like, due to the relatively short distance between the transmission and the drive axles. In front mounted drive axes, especially those equipped with inter-axle differential and transfer gearing to the pinion shaft which is mounted in front of the axle carrier, the distance is further reduced requiring an exceedingly short drive shaft with very large universal joint angles.

Prior to the invention it was considered that these inter-axle differentials and transfer gearing arrangements could not be used in these short-coupled vehicles, and so separate drive shafts from the transmission to each tandem axle had to be used. This complicated the driving arrangements and added considerably to the dead weight, maintenance and installation problems and provided an additional source of possible trouble in service.

Furthermore, when incorporating transfer spur gearing for driving from the transmission drive shaft to the lower pinion shaft from in front of the axle an intermediate idler gear has to be employed to drive the pinion shaft in the same direction of rotation as the main drive shaft, thus further adding to the weight, size and cost of the drive mechanism.

In addition, it has become increasingly widespread and necessary to equip the drive axles of heavy duty vehicles with a change speed gear incorporated in the final drive mechanism of the drive axle to supplement the speed range of the main transmission. However, in tandem drive axle equipped vehicles traveling in areas with continuously changing elevations and/or changing surface conditions even this additional speed change gearing in the final drives was not sufficient to provide maximum performance. For this reason, auxiliary multi-speed transmissions have been used with further complications regarding sufficient length and angular position of the main drive shaft in addition to the added weight, cost and installation problems.

In overcoming the foregoing disadvantages, the present invention provides a tandem axle drive mechanism equipped with multi-speed change gear and inter-axle differential and constructed such as to be usable in short coupled heavy duty vehicles without having the main drive shaft assume an extreme angular position, and this is an object of the invention.

A further object of the invention is to provide a novel tandem drive axle assembly wherein the forward and rearward axle units have interchangeable housing sections and gearing.

Another object of the present invention is to provide a tandem axle drive mechanism for heavy duty vehicles wherein the drive input is provided with a multi-speed selective change gear in novel combination with an inter-axle differential and lockout therefore.

Another object of the present invention is the provision in a tandem drive axle assembly of a planetary or equivalent change speed gear attached to the front of the forward axle unit housing and an inter-axle differential mechanism mounted on the rear of that housing with spur gear trains at the rear of each axle unit to transfer driving forces from the drive shafts to the pinion shafts.

A further object resides in the provision of a tandem axle driving arrangement which drive shafts are coaxial in a common vertical plane extending above the axle shafts and through the axle housings to transfer their driving torque into the axles from the rear, thereby eliminating undesirable high shaft angularity and allowing sufficient length for the front input propeller shaft in short coupled vehicles.

Another object is the provision of a multi-speed driving arrangement for tandem axle vehicles having mainly interchangeable and substantially identical components to compose a variety of from single to multi-speed driving arrangements.

It is an object of the invention to provide a novel tandem drive axle assembly wherein basic components of the forward and rearward axles are similar and interchangeable, with some being replaceable by components providing different speed ranges without effectively disturbing the relationship of the other components.

Another object of the invention is to provide a novel tandem drive axle assembly wherein the forward drive axle comprises a novel housing structure and a rear mounted differential assembly.

Another object of the invention is a novel drive axle assembly wherein a drive axle housing has a forwardly mounted multi-speed input unit and rearwardly mounted differential connected to a rearwardly mounted pinion shaft and a rearwardly extending propeller shaft.

Another object of the invention is to provide a novel drive axle assembly wherein the pinion shaft is rear mounted and driven from a rear mounted gear train.

It is a further object of the invention to provide a novel tandem drive axle assembly wherein the input shaft is connected to a rear mounted differential unit on the forward axle, and the output sides of the differential are connected to similar rear mounted pinion shafts on the forward and rearward axles respectively in the assembly. Pursuant to this object multi-speed gear assemblies may be interposed at the input to the differential or at the output of the differential to increase the drive ranges of the assembly. In one allied object the rearward axle may be a conventional type axle having a front mounted pinion shaft.

Other objects and novel features will become evident or specifically be pointed out in the following detailed description in connection with the attached drawings in which:

FIGURE 1 is a top plan view showing a tandem axle driving arrangement according to a preferred embodiment of the invention and incorporating a two-speed planetary mechanism;

FIGURE 2 is a side view of the apparatus of FIGURE 1 on a slightly reduced scale and partly in section;

FIGURE 2a is a side view similar to FIGURE 2 but illustrating a three or four speed driving arrangement;

FIGURE 2b is a further side view similar to FIGURE 2 illustrating another three speed driving arrangement but without the planetary;

FIGURE 2c is a similar side elevation showing a single speed tandem axle;

FIGURE 2d is a side elevation of a form of the invention wherein a conventional rear axle is used;

FIGURE 3 is an enlarged side elevation partly in longitudinal sectional through the forward axle driving arrangement of the tandem assembly shown in FIGURES 1 and 2;

FIGURE 4 is a similarly enlarged side elevation partly in longitudinal section through the rear axle driving arrangement of the tandem assembly in FIGURE 1 illustrating the single speed reduction;

FIGURE 5 is a rear elevational view of the forward axle of FIGURE 3 along line 5—5 of FIGURE 3; and FIGURE 6 is a front elevational view of the forward axle of FIGURE 3 along line 6—6 of FIGURE 3.

With reference to FIGURES 1 and 2, a tandem axle driving assembly 10 comprises a forward drive axle unit 12 and rearward drive axle unit 14 which in a conventional manner are connected by spring and like suspension means (not shown) to the frame of the vehicle (not shown).

Forward axle unit 12 comprises a transverse axle housing 16 having an intermediate bowl or carrier portion 18 containing a final drive mechanism 20 drivingly connected to axle shafts 22 for rotating the road engaging wheels (not shown) in the usual manner.

Rearward driving axle unit 14 comprises a transverse axle housing 24 having an intermediate bowl or carrier portion 26 containing final drive mechanism 28 drivingly connected to axle shafts 30 for rotating the road engaging wheels (not shown) in the usual manner.

The drive axle units 12 and 14 are interconnected by special drive mechanism presently to be described to transmit power from the main transmission of the vehicle (not shown) through a main drive or propeller shaft 32.

With reference now to FIGURE 3 illustrating the two-speed forward axle unit driving arrangement, main drive shaft 32 is connected through universal joint 33 and a drive flange 34 to a relatively short shaft 36 extending into an auxiliary housing 38 which is attached to housing 16 forwardly of the carrier portion 18 at the upper section thereof (FIGURE 3).

Auxiliary housing 38 contains a two-speed planetary gear set 40 to provide both tandem axles 12 and 14 with two selective input speeds in addition to the multiple change speeds of the main transmission.

Shaft 36 is rotatably supported by antifriction bearings 42 and 44 within the front part 46 of auxiliary housing 38. The rear part 47 of housing 38 is secured to the front part 46 as by bolts 49, and is suitably fixed as by welding onto the axle housing carrier portion 18. Shaft 36 has an integral radial flange 48 having a circumferential row of splines 50 meshing with internal splines 52 of a ring gear 54 which is thus drivingly connected and supported by the flange 48.

Ring gear 54 is so mounted on flange 48 that it is not restrained in the radial direction so that it can float radially to equalize driving forces as will appear.

Ring gear 54 is provided with internal teeth 56 which constantly mesh with the teeth 58 of a plurality of planetary pinions 60 (usually 3) equally distributed within the internal diameter of the ring gear 54. Pinions 60 are rotatively supported on pins 62 having oppositely projecting ends 64 and 66. Pins 62 are provided with oil conducting channels 63 to provide lubrication of the pinion pin bearings 65 by oil scoops 67 which dip into the pool of oil at the bottom of housing 38.

Each pinion pin end 64 is fixed within an aperture 68 in a radial flange 70 of a shaft 72 coaxial with shaft 36 so that all pinions 60 are connected to flange 70 for transfer of driving power whenever pinions 60 move around the internal surface of the ring gear 54. Flange 70 is preferably integral with shaft 72 which extends through the rear part 47 of the auxiliary housing 38 into the axle housing 16 substantially above the level of axle shafts 22.

The other pinion pin ends 66 extend into corresponding apertures 74 of a radial flange 76 at the opposite side of pinions 60 from flange 70 so that flanges 70 and 76 rotate together. Flange 76 is provided with a hub 78 having axially facing inclined dog type teeth 80 around the end thereof. This hub 78 and teeth 80 form one element of a clutch 82 known as the Maybach-type such as described in detail in United States Patent No. 2,791,130 to L. G. Boughner. Teeth 80 are adapted to selectively engage teeth 84 at one side of a clutch shift collar 86 having teeth 88 at the other side adapted to selectively engage teeth 90 of a clutch ring 92 non-rotatably attached to the housing part 47 as by bolts 94. Ring 92 is slidably mounted on bolts 94 so as to allow the clutch ring to be displaced axially to a limited degree. Clutch ring 92 is axially biased toward shift collar 86 as by a series of equally spaced compression springs 96.

Axial shifting of the clutch collar 86 to mesh with teeth 80 or teeth 90 may be accomplished by a shift mechanism 98 (FIGURES 2 and 6) connected to a yoke 99. This shift mechanism may be identical to the shift mechanism disclosed in said Patent No. 2,791,130 although any equivalent may be used. This shift mechanism may be powered by fluid pressure or electrical motors as desired.

Clutch collar 86 is provided internally with splines 100 by which it is axially slidably mounted upon the splined hub 102 of a sun gear 104 whose teeth 105 constantly mesh with the pinion teeth. Sun gear 104 is coaxial with and extends relatively rotatably around shaft 72 with sufficient clearance to allow shaft 72 to rotate freely within hub 102 whenever hub 102 is held stationary.

When shift collar 86 is displaced to the left to the full line position shown in FIGURE 3 where it meshes teeth 84 with teeth 80, this causes pinions 60, shaft 72 and sun gear 104 to be locked together so that they are rotated together by the ring gear 54 as a unit around the axis of the shaft 72. When collar 86 is displaced to the right in FIGURE 3 to mesh teeth 88 with teeth 90, this locks the sun gear 104 non-rotatably to the housing part 47. The pinions 60 now rotate on their axes as they transmit the drive between ring gear 54 and shaft 72. This provides a speed reduction between shafts 36 and 72, as compared to the direct drive from shaft 36 to shaft 72 when the collar is in the left position.

Thus a selective two speed drive is provided within auxiliary housing 38 between shaft 36 and shaft 72.

The splined end 71 of shaft 72 lines within axle housing 12 and is non-rotatably connected to the splined end 73 of a coaxial shaft section 106 by a splined connector collar 108. The adjacent ends of shafts 72 and 106 are suitably axially spaced within collar 108 by a spacer ring 110 held against radial movement by a pin 112 in one of the shafts.

The other end of shaft section 106 extends outwardly of axle housing 12 into another auxiliary housing 114 attached to the rear side of axle housing 12. Shaft section 106 is suitably rotatably supported within housing 114 by antifriction bearing 116.

The end of shaft section 106 is preferably of bell shape so as to comprise one-half 118 of the differential cage 120 of an inter-axle differential mechanism 121 positioned within auxiliary housing 114. The other half 122 of the differential cage is likewise formed like a bell and both halves are secured together as by bolts 124.

Secured within the differential cage 120 is a spider 126 which rotatively supports a number of bevel gear pinions 128 in constant mesh with opposite side gears 130 and 132.

Side gear 130 is non-rotatably splined at 131 upon the hub 134 of a spur gear 136 which is rotatably supported by antifriction bearings 138 and 140 supported within a further auxiliary housing 142 which is rigidly attached as by bolts 144 to auxiliary housing 114. Spur gear 136, which may be a helical gear, is in constant mesh with another spur gear 146 shown in broken lines in FIGURE 3 supported within auxiliary housing 142. Spur gear 146 is of preferably the same size as spur gear 136 and has the same number of teeth so that there is no speed ratio change between these two gears.

As shown in FIGURES 1 and 5, gear 146 is positioned in a different vertical plane and at a lower level from gear 136, and is attached to a pinion shaft 148 which extends into the bowl 18 of the axle housing 16 and carries at its other end a bevel pinion 150. Pinion 150 meshes with a bevel ring gear 152 which constitutes together with pinion 150 and final axle drive 20. Pinion 150 and ring gear 152 are preferably hypoid gears as shown in FIGURES 2 to 4; that is, pinion 150 is offset, in this instance above, from the centerline of the ring gear. It will be understood that the ring gear 152 is attached to the usual differential mechanism within axle housing 12 (not shown) which differentially drives the axle shafts 22 in the usual manner. Thus rearmost side gear 130 is drive connected to the forward drive axle of the tandem assembly.

Final drive 20 mechanism of the forward drive axle unit 12 is thus driven from the rear through the spur gears 136, 146 and differential mechanism 121 in any of two selective speeds provided by the planetary gearing 40. By locating the power input into forward drive axle unit 12 at the rear of the axle unit rather than at the front considerably shortens the housing extension forwardly of axle unit 12, thus assuring sufficient propeller shaft length between the main transmission (not shown) and forward axle unit 12 to considerably reduce the angularity of the propeller shaft.

The opposite side gear 132 of differential mechanism 121 is splined directly at 133 to a shaft 154 which extends rearwardly through the differential 121 and freely rotatably through the hub of spur gear 136 to be rotatively supported adjacent gear 136 in an anti-friction bearing 156 supported within an adapter housing 158 secured to the rear of auxiliary housing 142 as by machine screws 160. Shafts 154, 106, 72 and 36 are all coaxial along a common horizontal plane normal and transverse to the axle shafts 22 and together they constitute a continuous length of a through drive shaft extending through forward drive axle unit 12 to provide a drive connection to the rear drive axle unit 14.

The inter-axle differential mechanism 121 is adapted to compensate for slight differences between the speeds between the forward axle unit 12 and rear axle 14 unit caused by unequal tire pressures, tire wear or surface conditions, or the like. However, if wheels on one or both axles lose traction differentiating between the axles has an adverse effect in that no driving torque will be transmitted from the axle which has lost traction. For this reason, the differential mechanism 121 is provided with a lockout clutch 162 comprising a ring 164 splined at 165 to the hub 134 of spur gear 136 adjacent side gear 130 but outwardly of cage half 122. Clutch ring 164 has peripheral teeth 166 adapted to be engaged by the teeth of a shift collar 168 which is selectively engageable with another set of teeth 170 on the outside of differential cage half 122. Shifting of the clutch collar 168 may be accomplished by a shift mechanism 172 attached to the outside rear of auxiliary housing 114 as shown in FIGURES 1 and 5 which may be similar to shift mechanism 98.

When the collar 168 has been shifted to the left as shown in FIGURE 3, the collar is disengaged from the teeth 166 of ring 164 thus allowing normal differential action. When shift collar 168 is shifted to the right in FIGURE 3 this causes the teeth of the shift collar to engage both sets of teeth 166 and 170 thus locking differential cage 120, side gear 130 and gear 136 for rotation together this preventing any differentiating action between shafts 148 and 154.

Continuous lubrication of the differential mechanism 121 is accomplished by a pump mechanism 174 disposed in the front part of auxiliary housing 114 and suitably driven by the shaft section 106 to continuously pump lubricant from the housing sump into the differential cage 120 by way of channel 176 in shaft section 106. Otherwise the lubricating pump mechanism 174 does not form part of the present invention.

Shaft 154 extends outwardly of auxiliary housing 142 and one yoke 178 of a universal joint 179 is mounted on shaft 154 with a splined fit. The other yoke of the joint 179 is connected to an intermediate drive shaft 180 which extends between axle units 12 and 14.

FIGURE 4 illustrates a single speed rear axle driving unit 14 which as shown in FIGURE 1 may be used in tandem assembly with the forward axle driving unit 12 of FIGURE 3. The rear end of drive shaft 180 is connected by universal joint 182 to a yoke 184 splined upon a shaft 186 extending entirely through axle housing 24 of the rear drive axle unit 14 above and normal to the axle shafts 30. Shaft 186 is normally coaxial, that is, on the same centerline with shafts 180, 154, 106, 72 and 36 so that a coaxial straight line through drive connection the axis of rotation of which lies in a substantially horizontal plane is provided between the two axle units 12 and 14.

The front end of shaft 106 is supported in an anti-friction bearing 188 mounted in an adapter housing 190 fixedly attached to the front of the rear axle bowl 26. Shaft 186 extends rearwardly into and through an auxiliary housing 192 suitably attached to the rear of the axle housing 24. Auxiliary housing 192 is preferably identical to and interchangeable with auxiliary housing 114 of the forward axle unit 12 shown in FIGURE 3. However there is no differential mechanism within housing 192 and the pump 174 of FIGURE 3 is omitted.

The rear end of shaft 186 extends outwardly of auxiliary housing 192 into auxiliary end housing 194 which is preferably identical to and interchangeable with the auxiliary housing 142 of the forward axle unit 12 shown in FIGURE 3. Housings 114 and 192, and 142 and 194 being interchangeable, this facilitates assembly, manufacturing and repair to thereby considerably reduce costs and inventory.

Within auxiliary housing 194, shaft 186 is splined at 191 within the hub of a spur gear 196 rotatively supported in antifriction bearings 198 and 200 on end housing 194. The outer bearing 200 is mounted in a bearing cover 202 closing the rear of auxiliary housing 194, as by screws 204.

Spur gear 196 meshes with a similar spur gear 206 positioned below and towards one side of spur gear 196 in a manner identical to the spur gear arrangement at 136, 146 in FIGURE 3. Gears 196 and 206 are located in the same relative position as shown for gears 136 and 146 in FIGURE 5.

Spur gears 196 and 206 may be helical gears and they are identical in size and number of teeth.

Lower gear 206 is splined at 207 to a pinion shaft 208 journaled in antifriction bearings 210 and 212 mounted within the axle bowl 26. The front end of shaft 208 carries a bevel pinion 214 meshed with a bevel ring gear 216. Pinion 214 and ring gear 216 which are preferably hypoid gears constitute the final drive 28 for rear axle unit 14 and this arrangement is essentially identical with the final drive arrangement of the forward axle unit 12.

Gears 146 and 206 and the final drives 20 and 28 of both forward and rear axle units 12 and 14 are identical and interchangeable with each other, thus further greatly facilitating manufacture, assembly and inventory and eliminating the possibility of accidentally installing wrong parts.

FIGURES 2a, 2b, 2c and 2d illustrate the versatility of the invention whereby the same basic drive components may be employed for achieving different single and multiple speed driving arrangements.

FIGURE 2a illustrates a multi-speed tandem drive axle assembly according to the invention wherein the housing 38 and the planetary gearing therein, axle housing 24 and the gearing therein, and the auxiliary housing 114 and the differential mechanism therein are the same as in FIG- URES 2 and 3, except that the output side of differential side gear 130 may be optionally connected, as through a suitable dog clutch arrangement (not shown) to either the gear train 136, 146 for driving the axle 12 at the same speed as in FIGURES 2 and 3, or to the reduction gear train indicated at 222 for optionally driving axle 12 at a different speed.

Besides the addition of the dog clutching arrangement the only other difference of FIGURE 2a over FIGURE 2 is that housing 142a in FIGURE 2a is somewhat larger to accommodate the gear set 222.

FIGURE 2b illustrates a multi-speed tandem drive axle assembly according to the invention wherein both front axle 12 and rear axle 14 include the added reduction gear set shown at 222 in axle 12 and at 224 in axle 14 within housing 194 which is correspondingly larger than housing 194 of FIGURE 2. Thus in FIGURE 2b the selective dog clutch would be at the rear end of shaft 186.

FIGURE 2c illustrates a single speed tandem drive axle according to a further embodiment of the invention wherein the two speed planetary housing 38 and the gearing therein of FIGURE 2 have been eliminated and the input yoke 34 extends through the axle housing 24 and is directly connected to the shaft assembly 72, 106 of FIGURE 3 whereby the input is applied directly to the differential gear cage within housing 114. Axle 14 remains as in FIGURES 2 and 4.

Instead of the single speed rear axle carrier 26 with the rear drive input arrangement shown in FIGURE 4, a front mounted hypoid carrier may be employed at rearward drive axle 14 as shown in FIGURE 2d. This hypoid carrier may be that disclosed in said United States Patent No. 2,870,853. In such case the propeller shaft 180 would be angularly disposed and connected through universal joint 213 to pinion shaft 208 now disposed at the same angle as shaft 180 and carrying pinion 214 meshed with ring gear 216, which latter is identical to the ring gear 152 in the forward axle and can be used even though the pinions in this instance would rotate in different directions. This is made possible by the use herein of novel hypoid pinion and ring gears of the type known as "Amboid" disclosed in co-pending application Serial No. 278,242 filed May 6, 1963.

From the foregoing it will be seen that a variety of other different multiple speed driving arrangements are possible by interchanging a few basic components according to the invention.

All these changes can be made without any alterations on the axle housings and final drive gear arrangements and by retaining the original desired minimum length and low angularity for the main propeller shaft 32, and low angularity of the intermediate drive shaft 180.

The through drive tandem axle drive mechanism of the invention thus lends itself to a variety of installation requirements with a minimum of interchangeable basic parts. By having the input to the axles at the rear rather than in front, space is used in an optimum manner and the necessity of idler gears to reverse rotation is eliminated.

The present invention may be embodied in other forms without departing from the essential characteristic and spirit thereof, therefore the present embodiments are to be considered illustrative only and not restrictive, the scope of the invention being indicated by the appended claims rather than by the foregoing description.

What is claimed and desired to be secured by Letters Patent is:

1. In a tandem drive axle assembly having forward and rearward transverse drive axle units, each of said axle units comprising a transversely extending drive axle housing having an intermediate carrier portion enclosing a differential mechanism disposed between opposed wheel driving axle shafts and having an input ring gear, said forward carrier portion having a rear opening, an axle housing portion extending over said rear opening of the forward axle housing carrier portion and projecting rearwardly therefrom, an interaxle differential mounted on said forward axle within said rearwardly extending housing portion, said interaxle differential having an input member having a section projecting through said forward axle carrier portion and then into said rearwardly extending housing portion at a level above the axes of said axle shafts adapted to be connected to a motor driven shaft and having two differentially driven output members connected respectively to drive said forward axle and to drive a propeller shaft leading to said rearward axle, and said drive connection to said forward axle comprising a pinion enclosed by said rearwardly extending housing portion and meshed with said ring gear and having a shaft projecting parallel to said input member section rearwardly from said forward axle, and gearing interconnecting one of said output members to said pinion shaft.

2. In the tandem drive axle assembly defined in claim 1, a rear axle pinion meshed with said rear axle ring gear, a rear axle pinion shaft projecting rearwardly from said rearward axle, and drive transmission means comprising a shaft assembly connected to said other output member and extending through said rearward axle housing carrier portion and gearing interconnecting said shaft assembly to said rear axle pinion shaft, said pinion shaft and said shaft assembly being parallel.

3. In a short coupled tandem drive axle assembly having forward and rearward transverse drive axle units each having a rearwardly projecting pinion shaft, a power input assembly mounted on said forward axle comprising a selective variable speed gear mechanism mounted forwardly on said forward axle, and an interaxle differential unit mounted rearwardly on said forward axle and interposed between said variable speed gear mechanism and said rearwardly projecting pinion shafts.

4. The forward drive axle unit of a short coupled tandem drive axle assembly comprising a transverse axle housing, a multi-speed transmission housing mounted on the front of said axle housing, an interaxle differential housing mounted on the rear of said axle housing, a gear housing mounted on the rear of said interaxle differential housing, a power input shaft rotatably mounted in said transmission housing, a transmission output shaft extending from said transmission housing through said axle housing into said differential housing, variable speed gearing in said transmission housing connecting said input and output shafts, a differential gear assembly in said differential housing comprising a cage drive connected to said output shaft and carrying two side gears, gearing in said gear housing for connecting one of said side gears to a rearwardly extending pinion shaft on said axle housing, and a driven shaft connected to the other side gear projecting through said gear housing for connecting to a propeller shaft drive to the rearward axle of the assembly.

5. The forward drive axle unit defined in claim 4 wherein said variable speed gearing is a two speed planetary gear assembly.

6. The forward drive axle unit defined in claim 4, wherein said axle housing contains axle shafts interconnected by a differential mechanism having a ring gear meshed with a pinion on said pinion shaft.

7. The forward drive axle unit defined in claim 6 wherein said gearing in said gearing housing comprises a hollow hub gear meshed with a gear on said pinion shaft, and said driven shaft extends through said hollow gear hub.

8. A tandem axle assembly comprising transverse forward and rearward drive axles each provided with a differential having a bevel ring gear, a bevel pinion meshed with said ring gear and a pinion shaft projecting rearwardly from the axle, an interaxle differential mechanism mounted on the forward axle and comprising a differential cage mounting opposed axle shaft driving side gears, means mounting a multispeed input drive mechanism on the front of said forward axle unit and drive connecting it to said interaxle differential mechanism, gearing connecting one of said side gears to the forward axle pinion shaft, and means including a propeller shaft assembly drive connecting the other of said side gears to the rear axle pinion shaft.

9. In a tandem drive axle assembly comprising transverse forward and rearward drive axle units each having a transverse drive axle housing, a rearwardly mounted auxiliary housing secured on each of said drive axle housings, a variable speed transmission housing mounted on the front of said forward drive axle housing, and a gear housing secured on the rear end of each of said auxiliary housings, said drive axle, auxiliary and gear housings being similar and interchangeable between the forward and rearward axle units.

10. A tandem drive axle assembly having forward and rearward transverse drive axle units, an interaxle differential mounted on said forward axle unit, said interaxle differential having an input member adapted to be connected to a motor driven shaft and having two differentially driven output members connected respectively to drive said forward axle unit and said rearward axle unit, characterized in that a change speed gear unit is provided on said forward axle unit between said motor driven shaft and said input member to selectively drive said axle units at different speeds and said differential output members are drivingly connected to substantially identical transfer gear mechanisms located at the rear of each said drive axle unit.

11. The tandem drive axle assembly defined in claim 10, wherein said change speed gear unit is mounted on the front of said forward axle unit and said differential is mounted on the rear of said forward axle unit.

12. The tandem drive axle assembly defined in claim 10, wherein the change speed unit is a two speed planetary gear mechanism.

13. The tandem drive axle unit defined in claim 11, wherein the change speed unit and the differential are coaxially mounted on said forward axle unit.

14. The tandem drive axle unit defined in claim 10, wherein each of said transfer gear mechanisms is a pair of meshed gears one of which is mounted on the pinion shaft of the respective drive axle unit and the other of which is disposed above it.

15. In a tandem drive axle assembly having forward and rearward transverse drive axle units, each of said axle units comprising a transversely extending drive axle housing having a carrier portion provided with a rear opening and enclosing a differential mechanism disposed between coaxial oppositely extending wheel drive shafts and having an input ring gear, auxiliary housings secured over the rear opening of each said carrier portion and projecting rearwardly therefrom, an interaxle differential mounted within the auxiliary housing on said forward axle, said interaxle differential having an input member having a section projecting rearwardly through said forward axle carrier portion and then into said rearwardly projecting auxiliary housing thereon at a level above the axes of said axle shafts adapted to be connected to a motor driven shaft and having two differentially driven output members connected respectively to drive said forward axle and to drive a propeller shaft leading to said rearward axle, said drive connection to said forward axle comprising a pinion meshed with said ring gear of said forward axle and having a shaft projecting rearwardly from said forward axle and gearing interconnecting one of said output members to said pinion shaft, said drive connection to said propeller shaft leading to said rearward axle comprising a rear axle pinion meshed with said rear axle ring gear, a rear axle pinion shaft projecting rearwardly from said rearward axle, and drive transmission means comprising a shaft assembly connected to said other output member of the interaxle differential and extending through the carrier portion and the auxiliary housing of said rearward axle, and gearing interconnecting said shaft assembly to said rear axle pinion shaft, there being a gear housing mounted on the rear end of each of said auxiliary housings enclosing said gearing, and said drive axle, auxiliary and gear housings being similar and interchangeable between the respective forward and rearward axle units.

References Cited

UNITED STATES PATENTS

| | | | |
|---|---|---|---|
| 1,679,805 | 8/1928 | Blumer | 180—22 |
| 2,166,099 | 7/1939 | Quartullo | 180—22 |
| 2,607,431 | 8/1952 | Buckendale | 180—22 |
| 2,693,244 | 11/1954 | Rockwell et al. | 180—22 |
| 2,870,854 | 1/1959 | Keese | 180—22 |
| 3,000,456 | 9/1961 | Christie | 180—22 |
| 3,029,888 | 4/1962 | Tapp | 180—22 |

A. HARRY LEVY, *Primary Examiner.*